No. 639,510. Patented Dec. 19, 1899.
J. BOOKER.
HOT AIR FURNACE.
(Application filed June 19, 1899.)
(No Model.)
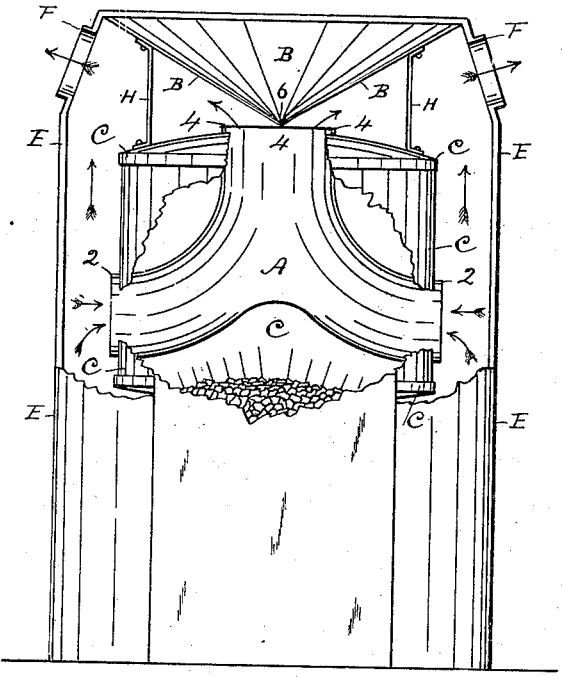
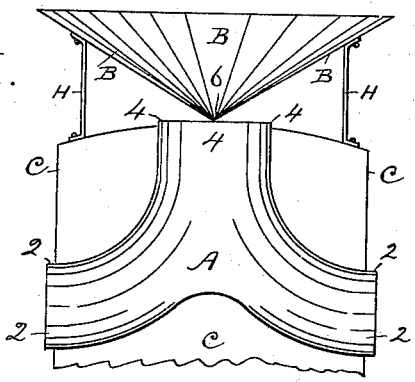
Witnesses
Jas. R. Harvey.
B. E. Herald
Inventor.
John Booker,
John K. Hendry.
Atty.

UNITED STATES PATENT OFFICE.

JOHN BOOKER, OF HAMILTON, CANADA.

HOT-AIR FURNACE.

SPECIFICATION forming part of Letters Patent No. 639,510, dated December 19, 1899.

Application filed June 19, 1899. Serial No. 721,129. (No model.)

*To all whom it may concern:*

Be it known that I, JOHN BOOKER, a citizen of Canada, residing at Hamilton, in the county of Wentworth, in the Province of Ontario, Canada, have invented a new and useful Improvement in Hot-Air Furnaces, of which the following is a specification.

My invention relates to a device for increasing the hot-air capacity of a furnace and equally distributing said hot air to the outlet-pipes; and it consists of a hot-air generator arranged immediately above the fire-pot to utilize the central waste heat above the fire.

The objects of my invention are, first, to increase the heating capacity of a hot-air furnace; second, to provide a generator capable of receiving air, heating the same to a very high degree, and equally distributing said hot air to the outlet-pipes, and, third, to equally distribute the hot air over the dome of the furnace from the generator and from around said dome and to equally distribute and force the said hot air through the several outlet-pipes connected to the upper part of the furnace-casing. I attain these objects by the device illustrated in the accompanying drawings, in which—

Figure 1 is a front elevation of the hot-air generator and distributer located and arranged in position above the fire-pot of a furnace. Fig. 2 is a front elevation of the same detached from the furnace, yet connected together by the medium of the outline of a furnace-dome.

Similar letters and figures refer to similar parts throughout both views.

The hot-air generater is indicated by A, and the hot-air distributer by B. This generator is substantially arranged and centrally located immediately above the fire-pot of a furnace and is capable of receiving air through its side branches or elbows 2 from the exterior of the dome C of a hot-air furnace D, this air-passage being indicated by arrows. This intensely-heated air passes out through the upper vertical and central part 4 of the generator and strikes the inverted cone or hot-air distributer B. Hence the hot air is equally distributed around the upper exterior part of the dome and the interior of the upper hot-air chamber of the furnace proper—that is, the inclosure formed by the hot-air wall or casing E of the furnace. It will be observed that this heated air from the generator comes in contact with the hot air in the upper hot-air chamber of the furnace, previously mentioned, and forces the expanded air equally through the several outlet-pipe connections F, which are arranged around said upper hot-air chamber, the passage of the hot air in the chamber and also out therefrom being indicated by arrows. The inverted cone or distributer is supported by the heating-dome by means of three or more stay-rods H.

It will be noticed that the vertical part of the generator slightly protrudes through the top of the dome and that the apex 6 of the inverted cone B is on a line therewith in order that the combined functions of the furnace, the generator, and the distributer may by the commingling of the hot air from the generator with the hot air of the furnace proper conduce to the objects set forth.

What I claim as my invention, and desire to secure by Letters Patent, is—

In a hot-air furnace, a vertical pipe with two side elbow branches in diametrical line and centrally located immediately above the fire-pot of the furnace and supported by the dome thereof, said elbows extending outside the dome, an outlet through the upper end of said vertical pipe and into the upper hot-air chamber of the furnace, in combination with a hot-air distributer supported by said dome immediately above the top thereof to equally distribute and guide the hot air from said pipe together with the hot air from around said dome equally through the outlet air-pipe connections F, arranged around the upper side of the hot-air chamber of the furnace, as described.

JOHN BOOKER.

Witnesses:
B. E. HERALD,
JOHN H. HENDRY.